March 26, 1946. J. BERNHARDT 2,397,084
METHOD OF MANUFACTURING PITOT-STATIC TUBES
Filed Dec. 11, 1943
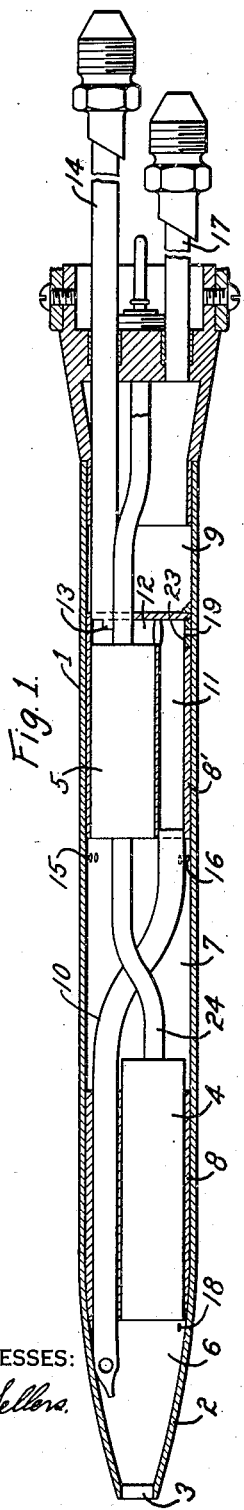
WITNESSES:
INVENTOR
Jacob Bernhardt.
BY
ATTORNEY Patented Mar. 26, 1946

2,397,084

UNITED STATES PATENT OFFICE 2,397,084

METHOD OF MANUFACTURING PITOT-STATIC TUBES

Jacob Bernhardt, Mansfield, Ohio, assignor to Westinghouse Electric Corporation, East Pittsburgh, Pa., a corporation of Pennsylvania Application December 11, 1943, Serial No. 513,902

3 Claims. (Cl. 29—148)

My invention relates to a method of assembly of the various elements of a Pitot-static tube. As is well known, Pitot-static tubes are mounted on the outer portion of an aircraft wing, outboard strut, or other location on the aircraft where the tube openings will be exposed to the undisturbed air flow. By means of suitable pipes the tube openings are brought into communication with an instrument designated "air speed indicator" mounted on the instrument panel of the aircraft.

The dynamic pressure is usually communicated to the interior of a hermetically sealed chamber which may take various forms. One form has bellows like an aneroid barometer. The static pressure of the air flow adjacent the pickup tube is in this form led to a similar bellows usually called a Sylphon bellows. These two bellows are mechanically coupled in position so that differential movement thereof is an indication of the air speed.

Since the Pitot-static tube must necessarily be located in the undisturbed region of the air flow, it is exposed to all climatic conditions and thus is particularly subject to the low temperatures usually surrounding an aircraft when flying at high altitudes. This means that if the Pitot-static tube passes through air laden with moisture in the form of fog, snow, rain or otherwise, moisture may collect in the tube and form liquid slugs or ice plugs in the tube. The air speed indicator may thus become entirely useless. With the modern type of Pitot-static tube, electrical heaters are disposed within the tube and suitable drain holes are disposed in the casing so that the tube remains relatively warm regardless of the temperatures surrounding it, and the air within the tube is robbed of its moisture content so that accurate indication may, nevertheless, take place. With one type of Pitot-tube regularly being manufactured and disclosed in detail in the patent of E. Daiber No. 2,300,654, issued on November 3, 1942, and entitled "Pitot tube," two heating cartridges are mounted within the tube, one in the forward region and one somewhat farther back. These heating cartridges have to be rigidly supported with reference to the outside casing and it has been found extremely difficult to solder or braze these heating cartridges and the supporting structure for them to the casing of the Pitot-tube.

One object of my invention is to eliminate the difficulties in the assembly of this type of Pitot-static tube.

Another object of my invention is to braze the elements disposed within a Pitot-static tube to the outside casing from the outside of the tube.

Other objects and advantages will become more apparent from the study of the following specification and the drawing accompanying the specification in which:

Figure 1 is a longitudinal sectional view of a Pitot-static tube constructed substantially in accordance with the teachings of the patent hereinbefore mentioned.

Fig. 2 shows the heating cartridges mounted on their heat-dissipating plugs for insertion into the housing of the Pitot-static tube; and Fig. 3 shows a detail of the rear heating cartridge and supporting plug therefor.

To better understand my contribution to the art, a brief description of the construction of the Pitot-static tube may be of value. The outer casing 1 is of conventional design, having a forward conical portion 2 spun into the shape shown, and provided with an opening 3 for receiving the dynamic pressure of the air through which the Pitot-static tube is moving.

The casing is provided with a forward heating cartridge 4 and a rear heating cartridge 5, and the construction of the plug mounting the heating cartridge 4 is such that the chamber 6 is completely sealed off, when the plug is brazed into place, from chamber 7. The supporting plug 8 is such that there is free communication between chamber 7 and chamber 9.

The dynamic air pressure is received in chamber 6 by tube 10 and carried to the channel 11 in the plug 8 from which channel it moves to the vertical channel 12 past the baffle 13 into tube 14 leading to one of the pressure responsive elements of the air speed indicating instrument. The static air pressure passes into chamber 7 through openings 15 and 16 past the plug 8 into chamber 9 from whence it is transmitted by means of tube 17 to the other element of the air-speed indicating instrument.

The housing 1 is provided with openings 18 and 19 for draining out all of the moisture that may enter at opening 3, so that the air contained in tube 14 will be perfectly dry, so that there will be no opportunity of fouling the operation of the air-speed indicating instrument. To provide for accurate indication, it is extremely essential that the forward plug 8 make a perfect seal between chambers 6 and 7 and similarly that there be a perfect seal at the right-hand end of plug 8'.

By the method heretofore used, the elements to be disposed within the casing 1 are all assembled as shown in Fig. 2 and then inserted within the casing 1. After being properly positioned in casing 1, the plug 8 was brazed to the outside casing at the region 20 by means of brazing material inserted through opening 3. Similarly, the brazing at region 21 was accomplished through the insertion of brazing material through tube 17. It has been found extremely difficult and expensive to provide a proper seal at the region 21. Furthermore, the number of units assembled that had to be rejected was rather large.

I have found that very satisfactory seals can be produced at region 21 by drilling a relatively large opening 22 into the casing 1 at the region where it is later expected the drain hole 19 is to be placed. Then the assembly shown in Fig. 2 and including the plug of brazing material 23 at the rear end of plug 8' is inserted within the casing 1 until the plug 23 registers with the opening 22. If plug 8 is inserted deep enough to be blocked by the spun-over portion 2 and the plug 8' is not quite in correct position such that the brazing material 23 registers with the opening 22, then the tube 10 and conductor 24 may be extended or compressed somewhat without impairing the relationship of the parts until the soldering material 23 does register with the tube 22. The whole assembly may then be placed in the brazing furnace whereupon the brazing material, by reason of the capillary attraction inherent in the assembly, will completely wet the right-hand end of the plug 8' making a perfect seal at this region and thus also holding the plug 8' in position. To provide for the necessary drain hole 19, the brazing material, which will now also fill the opening 22 as shown in Fig. 3, is drilled out to form the drain hole 19. This method of assembly just described has been found to eliminate substantially all "rejects" and has greatly reduced the manufacturing cost of the tubes.

It is not an essential part of my invention that the rear bottom end of the plug 8' be first provided with a lateral opening and then filled with a brazing material 23 before brazing, but since the well 11 has to communicate with the baffle-provided left end of tube 14 through channel 12, it is, of course, much cheaper to drill out the channel 12 by drilling laterally through the walls of the plug at the bottom of the well. The hole thus made can be again filled by a suitable screw-threaded plug as 23. In this case the hole 22 is filled with brazing material and then the brazing is done in a brazing furnace all from the outside so to speak. The brazing thus need not be done through tube 17.

When the plug 23 itself is brazing material an amount slightly in excess of that actually needed is used so that proper wetting occurs and opening 22 is filled.

When plug 23 is not brazing material and hole 22 is for brazing purposes filled with brazing material, the parts are preferably positioned in the furnace so that hole 22 is at the top. When plug 23 is the brazing material, the parts may be positioned in the furnace in the position shown in Figs. 1 and 3. The positioning is not critical and good results are obtained regardless of the position of the parts in the furnace.

While I have shown but one embodiment, I do not wish to be limited to the particular showing made, but wish to be limited only by the scope of the claims hereto appended.

I claim as my invention:

1. In the method of assembly of a Pitot-static tube having a pair of tube casing heating cartridges disposed in a pair of spaced plugs connected together by heating conductors and a dynamic pressure collecting conduit, making a hole at the bottom rear end of the rear plug, filling the hole with brazing material, making a hole in the tube casing at a region of registry with the hole in the bottom rear end of the rear plug when in position, inserting the plugs, connected together by the heating conductors and pressure collecting conduit, into the tube casing till the brazing material in the rear plug registers with the hole in the tube casing, positioning brazing material through the front opening of the Pitot-static tube, against the front end of the front plug brazing the plugs and casing to each other, and drilling a small drain hole in the brazing material plugging the hole in the tube casing and the hole in the bottom rear end of the rear plug.

2. In the manufacturing steps for making a Pitot-static tube having a tube casing heating cartridge mounted in the top of a plug and the plug having a well longitudinally thereof and near the bottom thereof, the well extending to near the rear end of the plug, making a lateral hole at the bottom of the well, filling the hole with an excess of brazing material, making a hole in the tube casing, inserting the plug into the tube casing till the brazing material registers with the hole in the tube casing, brazing the plug to the tube casing in a brazing furnace whereby the brazing material will wet the entire rear end of the plug and contiguous inner casing surface and also filling both holes, making a relatively small drain hole from the outside through the plug of brazing material in the holes to thus provide a drain hole from the bottom of the well in the plug to the outside.

3. In the process of manufacturing a Pitot-static tube having a relatively long cylindrical outer casing and an electrically heated plug for positioning in the casing, the plug having a longitudinally disposed well at its bottom and a vertical channel at its rear end communicating with the well, providing the well with a lateral opening at the bottom of the plug, filling the opening with an excess of brazing material, providing the casing with an opening, positioning the plug in the casing till the brazing material registers with the opening in the casing, brazing the plug to the casing whereby a fluid tight connection is formed between the rear end of the plug and the inner wells of the casing and the lateral hole in the plug and the hole in the casing are filled with brazing material, drilling a small drain hole through the brazing material in the openings so that the rear end of the well communicates with the outside of the casing.

JACOB BERNHARDT.